(No Model.) 3 Sheets—Sheet 1.
J. N. KAILOR & M. T. REEVES.
BAND CUTTER AND FEEDER.
No. 549,198. Patented Nov. 5, 1895.
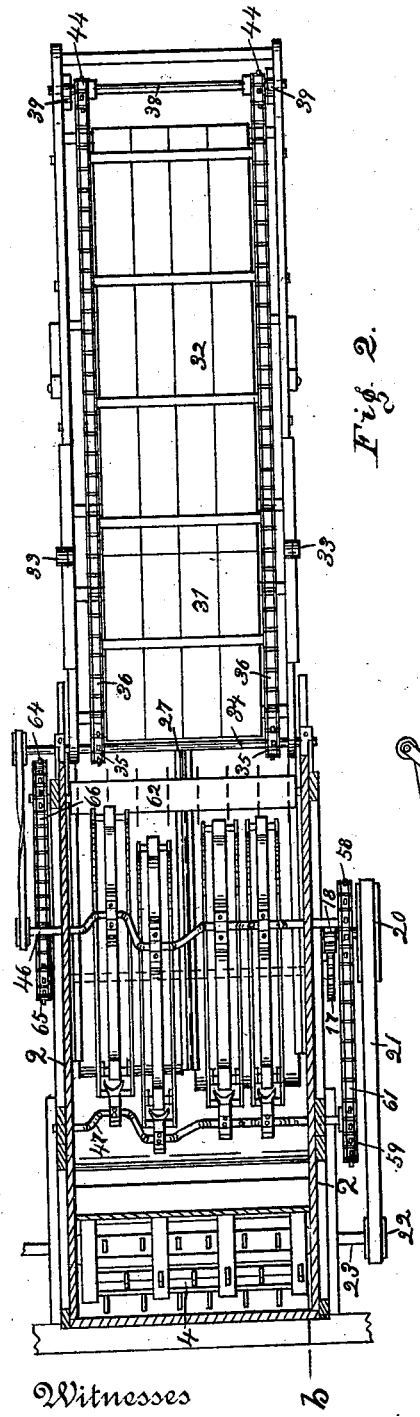
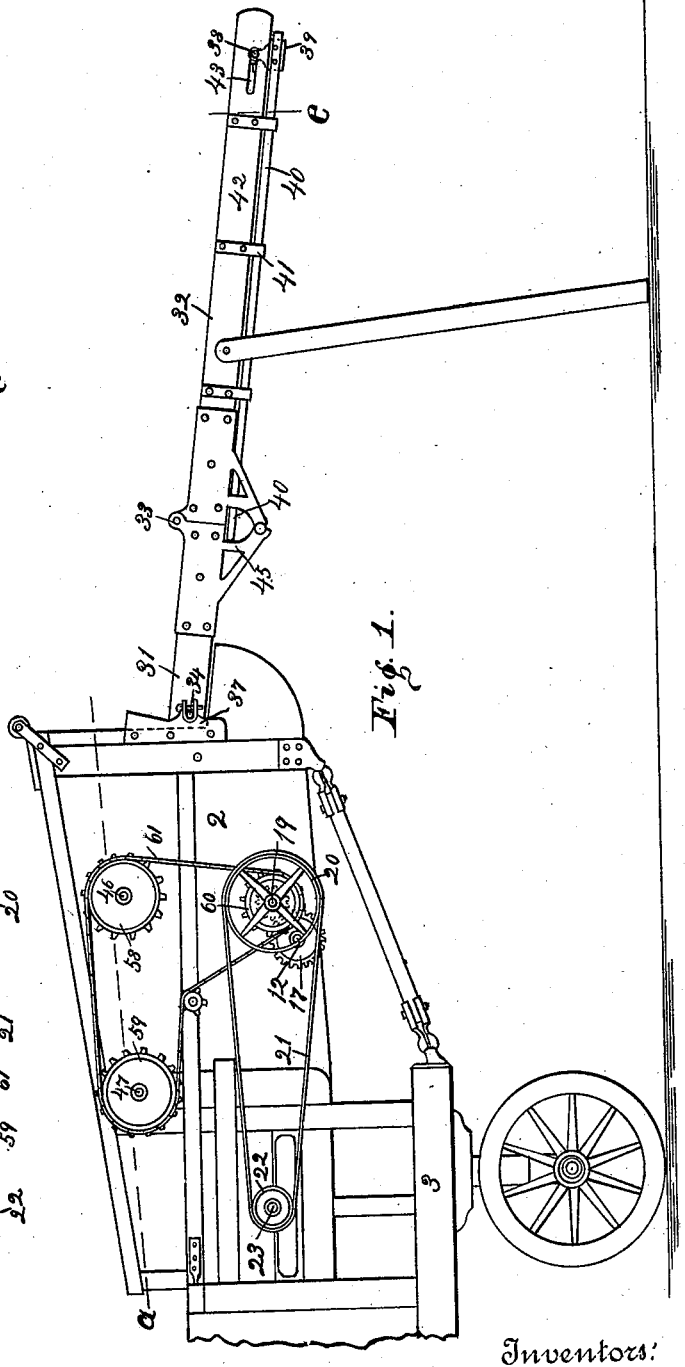
Witnesses
U. M. Hood.
M. V. Hood.
Inventors:
John N. Kailor.
Marshal T. Reeves.
By Attorney
H. P. Hood.

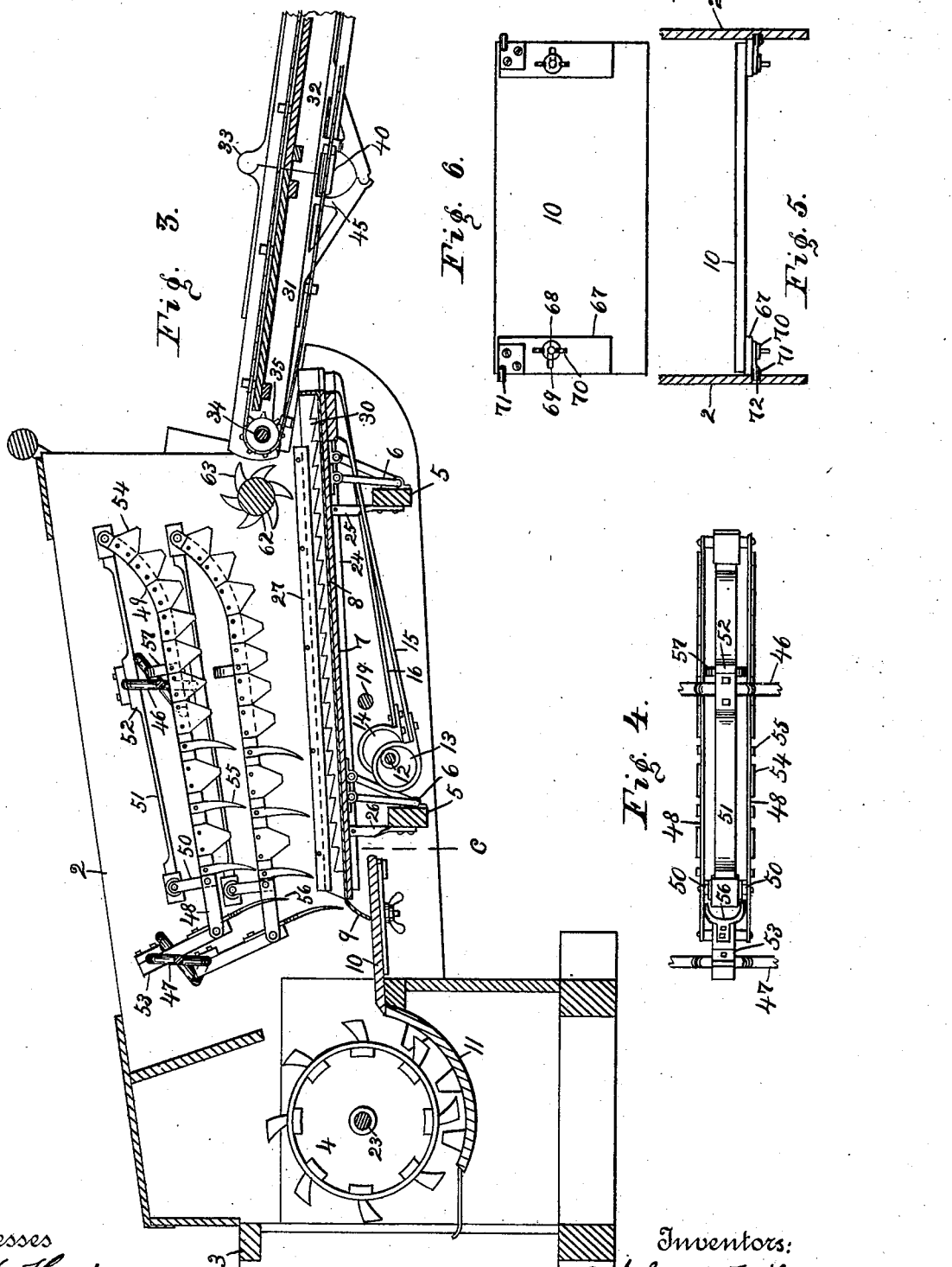

(No Model.) 3 Sheets—Sheet 3.
J. N. KAILOR & M. T. REEVES.
BAND CUTTER AND FEEDER.
No. 549,198. Patented Nov. 5, 1895.
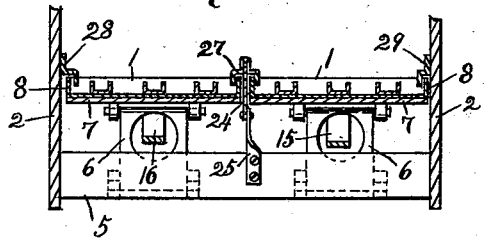
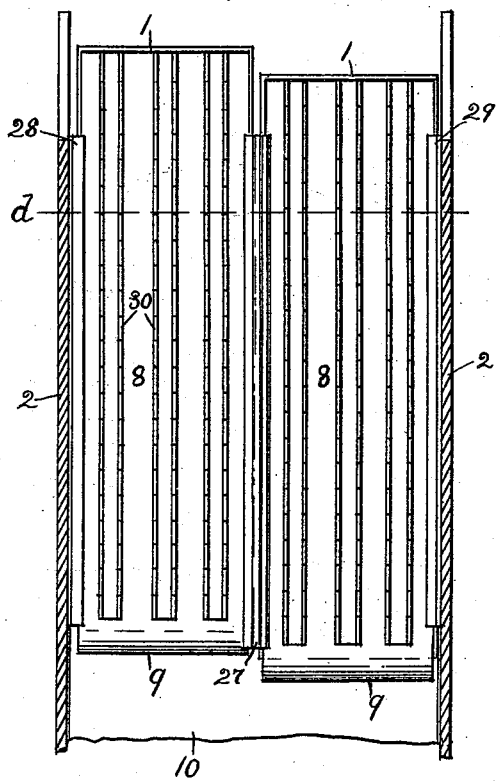
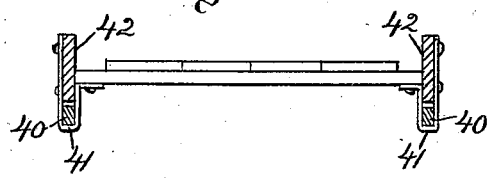
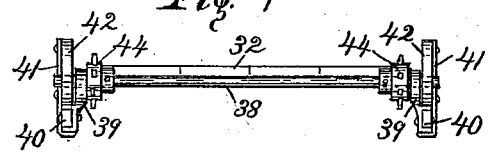
Witnesses
V. M. Hood.
M. T. Hood.
Inventors:
John N. Kailor
Marshal T. Reeves.
By Attorney
H. P. Hood.

UNITED STATES PATENT OFFICE.

JOHN N. KAILOR AND MARSHAL T. REEVES, OF COLUMBUS, INDIANA, ASSIGNORS TO REEVES & CO., OF SAME PLACE.

BAND-CUTTER AND FEEDER.

SPECIFICATION forming part of Letters Patent No. 549,198, dated November 5, 1895.

Application filed July 12, 1895. Serial No. 555,721. (No model.)

*To all whom it may concern:*

Be it known that we, JOHN N. KAILOR and MARSHAL T. REEVES, citizens of the United States, residing at Columbus, in the county of Bartholomew and State of Indiana, have invented a new and useful Improvement in Band-Cutters and Feeders, of which the following is a specification.

Our invention relates to an improved band-cutter and feeder for thrashing-machines.

Our improvemets are directed more particularly, first, to the construction of the cutter-bars, whereby they operate both as band-cutters and feeders and whereby they are yieldingly connected with their driving mechanism; second, to the arrangement of the driving mechanism for the cutter-bars, whereby a peculiar movement is imparted thereto; and, third, to the construction of the folding sheaf-conveyer, whereby the bearings for one of the shafts on which the conveyer-belt is mounted are shifted in position during the process of folding and unfolding the sheaf-conveyer, all as hereinafter fully set forth.

The accompanying drawings illustrate our invention.

Figure 1 represents a side elevation of our band-cutter and feeder in position for operation on the thrashing-machine. Fig. 2 represents a plan of the same at the line $a$, Fig. 1. Fig. 3 represents, on a larger scale, a longitudinal section at the line $b$, Fig. 2. Fig. 4 represents a plan of one of the cutter-bars, as seen from above. Fig. 5 represents a partial vertical transverse section at $c$, Fig. 3, showing the manner of securing the board connecting the feed-table and the thrashing-concave. Fig. 6 represents a plan of the connecting-board, as seen from below. Fig. 7 represents a plan of the reciprocating feed-table. Fig. 8 represents a vertical transverse section at $d$, Fig. 7. Fig. 9 represents an end elevation of the sheaf-conveyer, the conveyer-belt having been removed. Fig. 10 represents a transverse vertical section of the sheaf-conveyer at $e$, Fig. 1.

In the drawings, 2 designates the casing in which the band-cutter and feeder mechanism is mounted. This casing is secured to the thrashing-machine 3 above and in front of the throat leading to the thrashing-cylinder 4. Mounted in the lower part of the casing are a pair of reciprocating feed-tables 1 1, which are connected to the cross-timbers 5 5 by links 6 6, which support the feed-table in substantially the same horizontal plane, side by side, and inclined slightly toward the thrashing-cylinder. Each of the feed-table sections is constructed in the following manner: A bottom board 7 is provided, to which the links 6 are attached. Mounted upon and secured to the bottom board is a pan 8, formed of sheet metal and open at that end of the pan which is next to the thrashing-cylinder, the bottom of the pan being extended and bent downward, as at 9, so as to form a close connection with the upper surface of the connecting-board 10, which leads to the thrashing-concave 11.

A reciprocating movement is imparted to the feed-table sections by means of a shaft 12, mounted transversely in the casing beneath the feed-table and carrying a pair of eccentrics 13 and 14, which are connected with the feed-table sections by means of the connecting-rods 15 and 16. Shaft 12 is driven by means of a gear-wheel 17, secured thereto and intermeshing with a pinion 18, mounted on a second transverse shaft 19, mounted in the casing and carrying a band-wheel 20, which is connected by a belt 21 with the pulley 22, carried by the thrashing-cylinder shaft 23.

For the purpose of preventing the scattering of grain from the feed-table, and also for the purpose of assisting in directing the incoming straw to one or the other of the feed-table sections, we erect in the space between the adjacent edges of the two feed-table sections a sheet-metal partition 24, which is supported by standards 25 and 26, secured thereto and to the cross-timbers 5 5. Upon the upper edge of said partition is mounted a shield 27, formed of sheet metal folded longitudinally, so as to embrace the upper edge of the partition and also covering and loosely embracing the upper edges of the adjacent pans. Similar protecting-shields 28 and 29 are provided for the opposite edges of the pans, and they are secured to the inner sides of the casing. Each of the feed-table sections is provided with a series of ratchet-teeth 30, which operate to carry the straw and grain forward thereon.

Arranged at the open end of casing 2 and above the feed-table is a folding sheaf-conveyer, formed in two sections 31 and 32, which are connected together end-to-end by hinges 33 33. Section 31 of the sheaf-conveyer carries in fixed bearings a shaft 34, provided with a pair of sprocket-wheels 35, over which the bight of the endless conveyer-belt 36 passes. Shaft 34 projects from the sides of the sheaf-conveyer at each end and rests in bearings 37, secured to the casing, and thus forms a pivot on which the whole conveyer may be turned, so as to fold it up over the end of the band-cutter casing when not in use.

Section 32 of the sheaf-conveyer carries a shaft 38, which is mounted in bearings 39 39, which are secured to a pair of sliding bars 40 40, which are mounted so as to slide longitudinally in bearings 41, mounted at intervals along the sides of the conveyer-frame 42. The ends of said shaft 38 project through their respective bearings and enter a slotted opening 43, formed in the sides of the conveyer-frame, so that the shaft may have a sliding movement lengthwise of the conveyer-frame. This shaft carries a pair of sprocket-wheels 44 44, over which the conveyer-belt passes. The sliding bars 40 extend along the under edges of the sides of the conveyer-frame and project beyond the joints of the hinges 33, so as to come in contact with arms 45, projecting downward from the lower edges of the other section 31 of the conveyer, the arrangement being such that when section 32 is turned upward over section 31 the bearings carrying shaft 38 will be free to yield to the tension of the conveyer-belt, and when unfolded and straightened to the position shown in the drawings the ends of the bars 40 will come in contact with the arms 45, and thus push the bearings carrying shaft 38 outward, thus taking up the slack of the belt.

Extending transversely across the casing in the space above the feed-table are a pair of multiple-crank shafts 46 and 47, the cranks of shaft 47 being of about one-third less stroke than the cranks of shaft 46. Suspended from the cranks of shafts 46 and 47 are a series of combined feeder and cutter bars, each of which is constructed and mounted in the following manner: A pair of flat metallic bars 48 48 are bent edgewise near one end to form a curved portion 49. These bars are arranged side by side, leaving an open space between them, and are each provided near their straight ends with a standard 50. The standards 50 are connected with the upturned ends of the metallic bars by a wooden spring-bar 51, the bar being pivoted between said standards and between said upturned ends. This bar is thin throughout most of its length, so as to yield slightly to transverse pressure, but is provided between its points of attachment to the metallic bars and their standards with a thickened portion 52, in which is formed a bearing for one of the cranks of shaft 46. The straight ends of the bars 48 are pivoted to the opposite edges of one end of a pitman 53, which is connected at the other end with one of the cranks of shaft 47. Secured to the outer sides of the bars 48 and projecting below their lower edges are a series of triangular cutting-blades 54, forming at the front end of the cutter-bars a continuous serrated cutting-surface. Arranged alternately with the cutters 54, along the rear portion of the cutter-bar, are a series of feeding-teeth 55, which project below the cutters and are adapted to engage and throw forward toward the thrashing-cylinder the straw and grain after the sheaf-bands are cut.

For the purpose of aiding in the feeding movement each of the pitmen 53 is provided at its lower end with a downwardly-projecting fork 56. The bars 48 are further connected by a bent cross-bar 57, which forms a stop to limit the yielding movement of the spring-bar 51. A continuous rotary movement is imparted to shafts 46 and 47 by means of sprocket-wheels 58 and 59, secured, respectively, to the ends of the shafts, and a sprocket-wheel 60, secured to the driving-shaft 19, said sprocket-wheels being connected by the chain-belt 61. For the purpose of supporting the sheaf and moving it slowly forward when first engaged by the cutter-bars we mount at the end of the sheaf-conveyer and just within the band-cutter casing 2 a transverse roller or drum 62, provided with radially-projecting teeth 63, which are inclined backward in relation to the path of movement, so as to prevent the wrapping of the straw about the drum. A slow rotary movement toward the cutter-bar is imparted to the drum 62 by means of sprocket-wheels 64 and 65, secured, respectively, to the drum-shaft and to the shaft 19 and connected by a chain-belt 66.

In this class of machines it is desirable to have the board which forms a portion of the bottom of the feeding-chamber and which connects the inner end of the reciprocating feed-table with the thrashing-concave so mounted that it may be readily removed, so as to give access to the thrashing-cylinder in case it becomes clogged. For this purpose the connecting-board 10 is provided at each end with a cleat 67, which is adjustably connected to the board by means of a bolt 68, which is secured to the board and projects through a slotted opening 69 in the cleat and carries a thumb-nut 70, each of the cleats being provided with a laterally-projecting lug 71, which enters a corresponding opening 72, formed in the inner side of the casing. In placing the board in position the edge rests upon the edge of the concave 11 and the other edge is supported by the lugs 71, which are inserted in the sockets 72 by sliding the cleats outward.

In operation the bound sheaves being thrown upon the conveyer are carried forward to the drum 62 and feed-tables 1 1. While still partially supported by the drum, the sheaves are engaged by one or more of the series of cutter-bars, which operate first to cut the band and then to draw the sheaves forward toward the thrashing-cylinders. On account of the differing lengths of the cranks of shafts 46 and 47 and the manner of connecting the cutter-bars thereto the front ends of the cutter-bars are given a wide range of vertical and reciprocal movement, and a peculiar swinging movement is given to the entire cutter-bar, which greatly aids in the prompt and efficient cutting of the bands and the carrying forward of the sheaf after the band is cut. Should the sheaf contain any unusual hard substance likely to injure the cutters, the yielding connection formed by the spring-bar 51 between the shaft 46 and the cutter-bar prevents the breaking or other serious injury to the cutters, and under ordinary circumstances it is found that the yielding connection between the cutter-bar and its driving-shaft is of great advantage in insuring the prompt cutting of the band.

We claim as our invention—

1. In a band-cutter and feeder for thrashing machines, the combination of the casing, the feed-table forming the floor of said casing, a pair of multiple-crank shafts arranged one before the other across said casing above the feed-table, the outermost of said crank-shafts having longer cranks than the innermost crank-shaft, and a series of cutter-bars each mounted near one end thereof directly upon one of the cranks having the longer throw, and connected by a pitman at the opposite end with one of the cranks having the shorter throw, all substantially as and for the purpose set forth.

2. In a band-cutter and feeder for thrashing machines, the combination of the casing, the feed-table forming the floor of said casing, a pair of multiple-crank shafts arranged one before the other across said casing above the feed-table, the outermost of said crank-shafts having longer cranks than the innermost crank-shaft, and a series of cutter-bars each mounted near one end thereof directly upon one of the cranks having the longer throw, and connected by a pitman at the opposite end with one of the cranks having the shorter throw, said pitman being provided at its lower end with a fork 56, all substantially as and for the purpose set forth.

3. In a band-cutter and feeder for thrashing machines, the above described cutter-bar, consisting of a pair of light metallic bars bent edgewise at one end to form an upturned end for the cutter-bar, a pair of standards secured to said bars near their straight ends, cutting teeth secured to said bars along their sides and projecting below them, and a spring-bar secured at one end to said standards and at its opposite end secured to said upturned end of the bars carrying the cutting-teeth, said spring-bar being provided between its ends with a bearing adapted to receive a driving shaft, all substantially as and for the purpose set forth.

4. In a feeder for thrashing machines, the folding sheaf-conveyer, consisting of two conveyer-frame sections hinged together end-to-end, a shaft mounted in fixed bearings in one of said conveyer-frame sections and carrying a pair of pulleys adapted to receive an endless-belt carrier, a pair of bars suspended in bearings from the lower edge of the other conveyer-frame section and arranged to slide longitudinally therein, a pair of shaft bearings secured, respectively, to one end of said sliding bars, the opposite ends of said bars being arranged to project beyond the hinged joint between the two sections and to abut against the conveyer frame section carrying the fixed shaft, a shaft mounted in said bearings and carrying pulleys adapted to receive an endless conveyer-belt, and the endless-conveyer-belt mounted on said fixed and said movable shafts, all arranged to co-operate substantially as set forth, whereby the conveyer-belt is put in tension when the conveyer frame sections are extended, as set forth.

JOHN N. KAILOR.
MARSHAL T. REEVES.

Witnesses:
C. S. WAY,
HARRY O. WAY.